United States Patent [19]

Santandrea et al.

[11] Patent Number: 5,137,221
[45] Date of Patent: Aug. 11, 1992

[54] RAPIDLY CHANGEABLE CHUCKS FOR HOLDING STATORS IN STATOR PROCESSING APPARATUS

[75] Inventors: Luciano Santandrea; Massimo Lombardi, both of Firenze, Italy

[73] Assignee: Axis USA, Inc., Marlborough, Mass.

[21] Appl. No.: 592,667

[22] Filed: Oct. 4, 1990

[51] Int. Cl.$^5$ ............................................. B65H 8/06
[52] U.S. Cl. ............................................... 242/1.10 R
[58] Field of Search ............ 242/1.1 R, 1.1 A, 1.1 E; 279/15 G, 23 R, 79, 1 E; 226/151; 29/596; 24/115 L, 136 A

[56] References Cited

U.S. PATENT DOCUMENTS

| | | | |
|---|---|---|---|
| 1,139,595 | 5/1915 | Starr | 24/136 A |
| 1,926,725 | 7/1933 | Johnson | 279/1.1 E |
| 2,397,025 | 3/1946 | MacBlane | 279/1 E |
| 2,810,573 | 10/1957 | Nadel | 226/151 X |
| 2,904,270 | 9/1959 | Nill | 242/1.1 R |
| 2,953,290 | 9/1960 | Kostenko et al. | 226/151 X |
| 2,969,195 | 1/1961 | Leithe | 242/1.1 R |
| 3,043,614 | 7/1962 | Etchmann | 279/1 E |
| 3,106,120 | 10/1963 | Reece | 279/1 E |
| 3,994,521 | 11/1976 | Van Gompel | 24/136 A X |
| 4,141,117 | 2/1979 | Van Gompel | 24/136 A X |
| 4,216,568 | 8/1980 | Anderson | 24/136 A |
| 4,713,883 | 12/1987 | Santandrea et al. | 242/1.1 R X |
| 4,747,608 | 5/1988 | Sato et al. | 279/1 E X |
| 4,817,267 | 4/1989 | Hitomi | 279/79 C |
| 4,914,961 | 4/1990 | Wirth | 24/115 L X |
| 4,969,606 | 11/1990 | Santandrea et al. | 242/1.1 R |
| 4,977,738 | 12/1970 | Stahlecker | 57/281 |

FOREIGN PATENT DOCUMENTS

| | | | |
|---|---|---|---|
| 13693 | 8/1980 | European Pat. Off. | 24/115 L |
| 0332906 | 9/1989 | European Pat. Off. | 242/1.1 R |
| 0047709 | 9/1977 | U.S.S.R. | 242/1.1 E |

Primary Examiner—Daniel P. Stodola
Assistant Examiner—Michael R. Mansen
Attorney, Agent, or Firm—Karen G. Horowitz; Robert R. Jackson; Eric C. Woglom

[57] ABSTRACT

Apparatus for holding a stator (e.g., during stator processing steps such as the winding of coils on the stator) includes a first jaw member removably insertable in a housing and a second jaw member movably mounted on the first jaw member for releasably gripping a stator between the first and second jaw members. When stators of different sizes are to be held, the first and second jaw members can be readily removed, as a unit, from the housing and replaced by a differently configured first and second jaw member unit.

19 Claims, 5 Drawing Sheets

RAPIDLY CHANGEABLE CHUCKS FOR HOLDING STATORS IN STATOR PROCESSING APPARATUS

BACKGROUND OF THE INVENTION

This invention relates to apparatus for making stators for use in electric motors and the like. More particularly, the invention relates to chucks for holding stators during processing, said chucks being designed for rapid change when stators of different sizes are to be processed.

U.S. Pat. No. 4,969,606 shows stator processing apparatus in which the stator is held in a chuck which is in turn mounted in a housing. The chuck has two parts, one of which is movable relative to the other to releasably grip a stator between those two parts. When different size stators are to be processed, the two chuck parts can be removed from the housing by removing (or at least backing off) several screws, lifting out the chuck parts, putting in the new chuck parts, and replacing or retightening the screws. Alternatively, the entire housing and chuck may be removed from the associated stator processing apparatus by removing two screws. A new housing with new chuck parts can then be placed on the associated apparatus.

Both of the foregoing chuck replacement techniques may have certain disadvantages. Both are potentially time-consuming and require tools to manipulate the screws. If the screws are removed, they may become lost, and time may be wasted finding suitable replacements. In the case in which the chuck parts are removed from the housing, they become two separate parts which may be difficult to keep together for future use. In the case in which the housing is removed with the chuck parts inside, a relatively large and expensive component must be handled and replaced.

In view of the foregoing, it is an object of this invention to provide improved stator handling apparatus.

It is a more particular object of this invention to provide stator-holding chucks which can be changed more easily and rapidly than the prior art chucks, and which do not have the disadvantages associated with the prior art chucks.

SUMMARY OF THE INVENTION

These and other objects of the invention are accomplished in accordance with the principles of the invention by providing a chuck structure which includes a movable jaw member mounted on a fixed jaw member, which is in turn removably mountable on a housing structure. The movable jaw member is actuatable from outside the fixed jaw member, e.g., by actuator elements associated with the housing structure. The fixed jaw member may include means for properly orienting a stator for gripping by the jaw members. The fixed jaw member and the housing structure may have elements which cooperate to ensure proper orientation of the fixed jaw member relative to the housing. Releasable latch means may be provided for releasably latching the fixed jaw member into the housing. If provided, these latch means are preferably operable by hand so that no tools are required to change the chuck structure to accommodate stators of different sizes. Also, when these latches are released, the fixed jaw member and/or the housing may include means for automatically partially ejecting the chuck from the housing.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
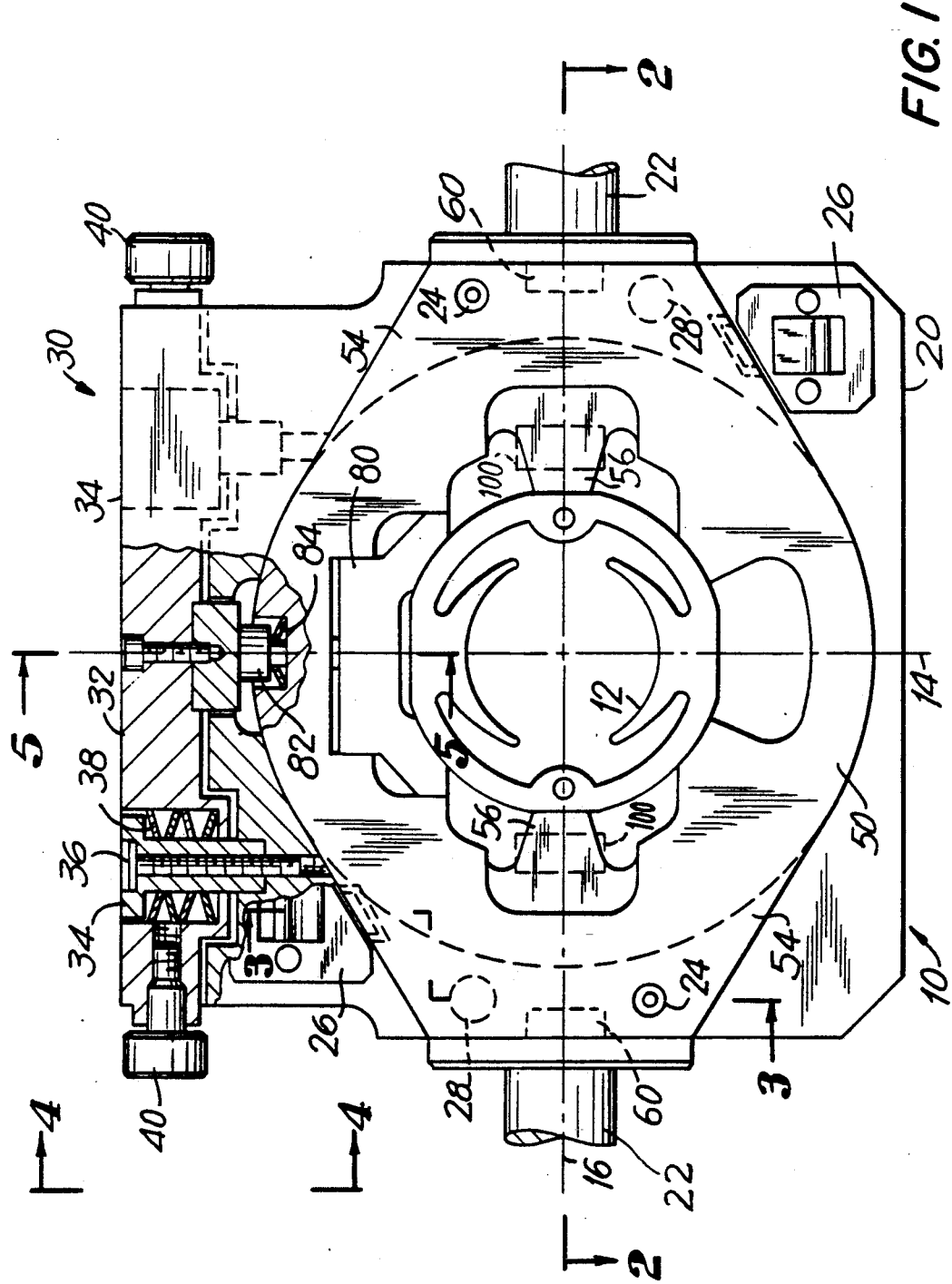
FIG. 1 is an elevational view, partly in section, of an illustrative embodiment of apparatus constructed in accordance with this invention.

Although it will be apparent to those skilled in the art that the apparatus of this invention can be used in other contexts, the invention will be fully understood from the following explanation of its application to apparatus of the type shown in U.S. Pat. No. 4,969,606.

In the FIGS. the chuck apparatus 10 of this invention is shown holding a stator 12. Chuck apparatus 10 comprises three principal parts: a housing 20 which is permanent in the sense that it does not change when stators of different sizes are to be gripped; a fixed jaw member 50 which is removably mountable in housing 20; and a movable jaw member 80 which is captured in fixed jaw member 50 but which is movable relative to fixed jaw member 50 parallel to axis 14. Members 50 and 80 collectively comprise the chuck which is replaced as a unit when stators of different sizes (especially different diameters) are to be handled.

Although not necessary to the present invention, housing 20 is shown supported by stub axles 22 for rotation about axis 16 in the manner in which the stator housings in above-mentioned U.S. Pat. No. 4,969,606 are rotatably mounted.

Figure 2:
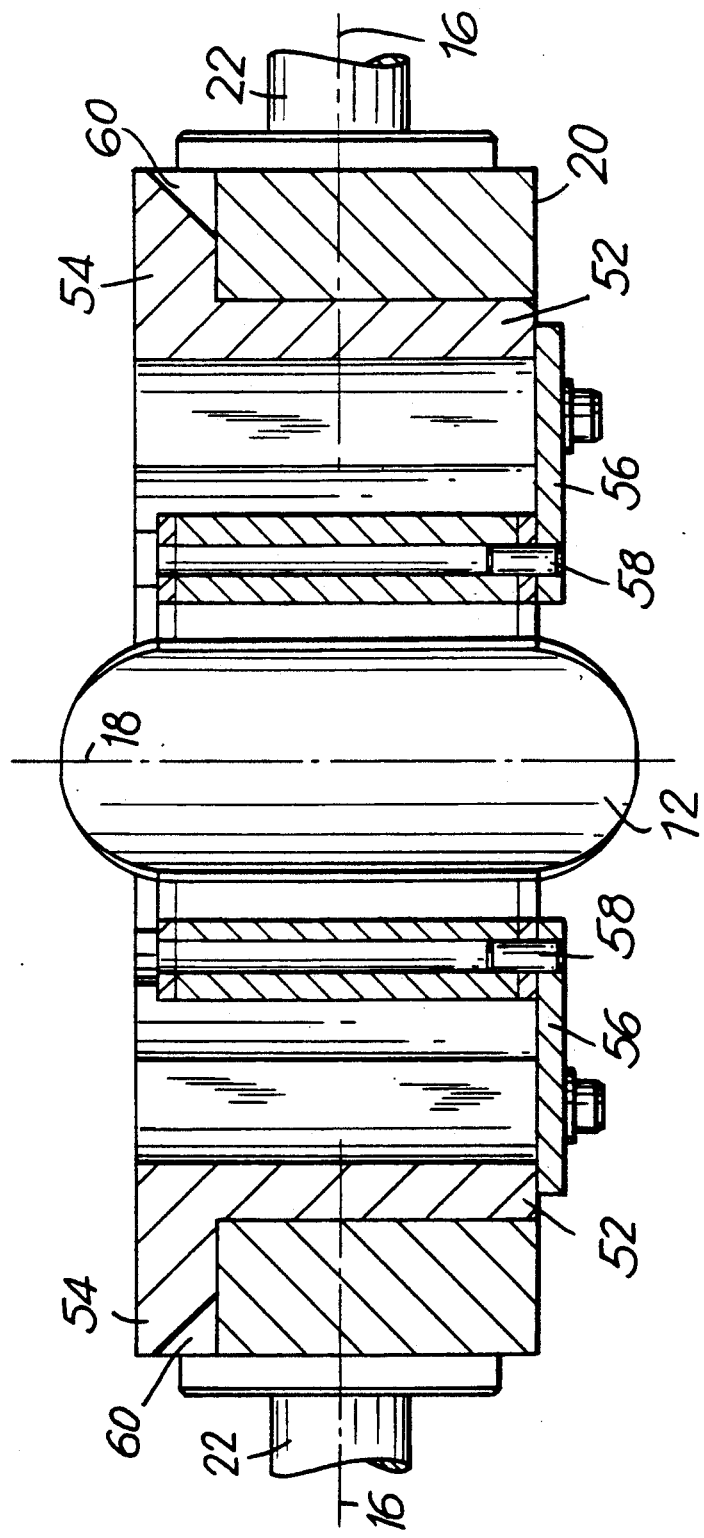
FIG. 2 is a sectional view taken along the line 2—2 in FIG. 1.

Fixed jaw member 50 includes a hollow annular main body 52 having flanges 54 which project diametrically outward parallel to axis 16 at one axial end of the main body. The outer cylindrical surface of the portion of main body 52 below flanges 54 fits snugly but removably in a cylindrical aperture in housing 20. When the chuck 50/80 is fully positioned in housing 20, the lower surface of flanges 54 (as viewed in FIG. 2) bears on the upper surface of housing 20 to reference the chuck relative to housing 20 parallel to axis 18. Before jaw 80 is moved to grip stator 12 between that jaw and the diametrically opposite portions of fixed jaw 50, stator 12 may be deposited in chuck 50/80 with one of its axial ends against stator stops 56. These stops are mounted on fixed jaw 50 and project into the interior of the fixed jaw adjacent one of its axial ends. Accordingly, stops 56 reference the stator relative to fixed jaw member 50 parallel to axis 18. Pins 58 on stops 56 extend into holes in the adjacent end of the stator to ensure proper angular orientation of the stator relative to the chuck. Pins 24 on housing 20 project into holes in flanges 54 to ensure proper angular orientation of fixed jaw 50 relative to the housing. Note that fixed jaw 50 is recessed away from stator 12 on diametrically opposite sides of the stator to facilitate insertion and removal of stators by means of spaced gripper arms (suggested by dotted lines 100) if desired.

Figure 3:
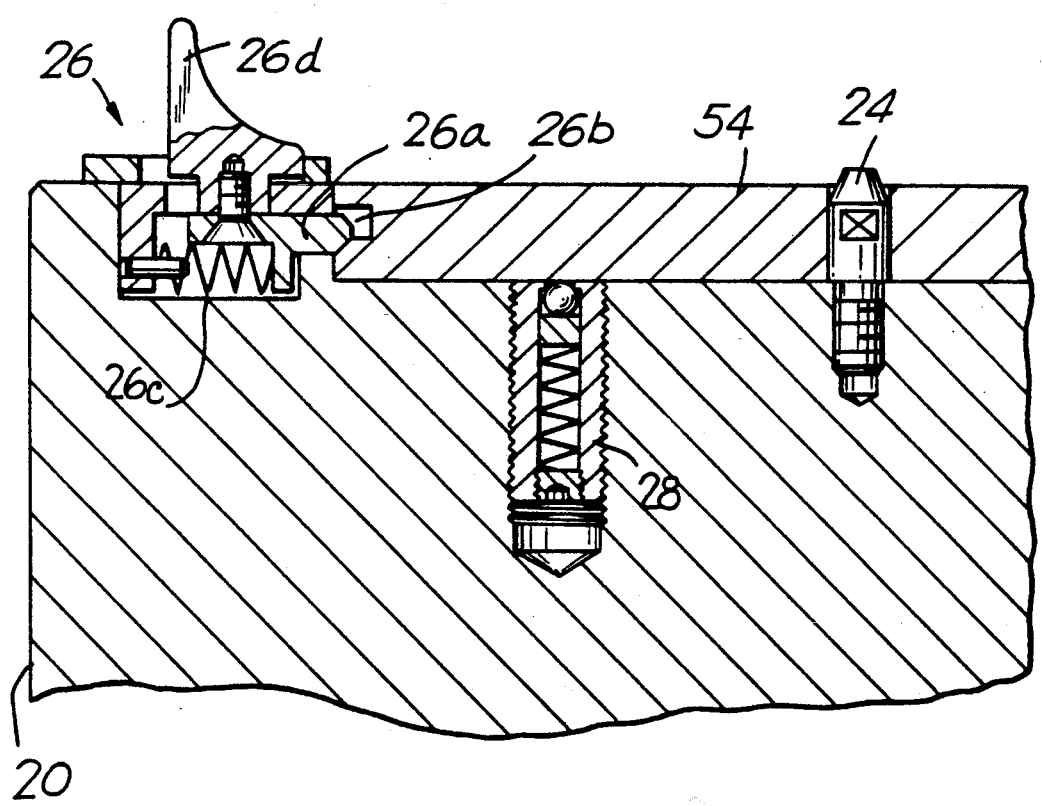
FIG. 3 is a partial sectional view taken along the line 3—3 in FIG. 1.
Figure 4:
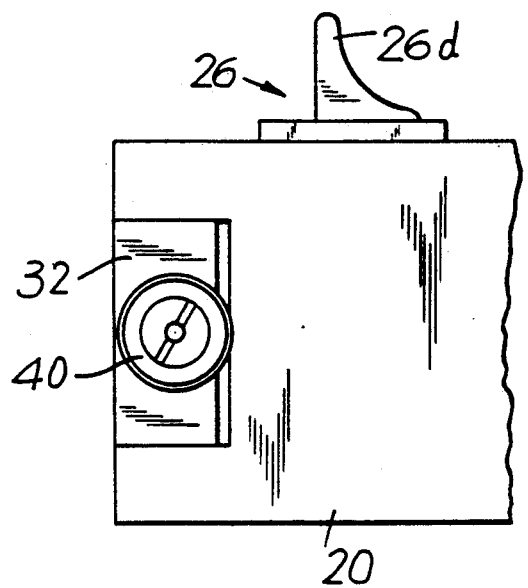
FIG. 4 is a partial elevational view taken along the line 4—4 in FIG. 1.
Figure 5:
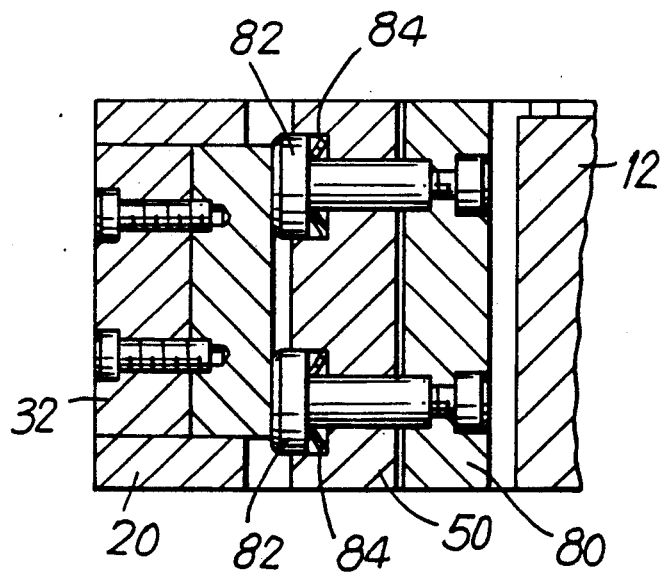
FIG. 5 is a partial sectional view taken along the line 5—5 in FIG. 1.

Chuck 50/80 is releasably latched into position in housing 20 by two spring-loaded latches 26 mounted on housing 20. As can best be seen in FIG. 3, each of latches 26 includes a latch finger 26a which is resiliently urged into a recess 26b in the adjacent flange 54 by a prestressed compression coil spring 26c. When it is desired to release chuck 50/80 from housing 20, each latch finger 26a can be pushed out of the associated recess 26b by pushing on the associated latch actuator 26d. Manual pressure on latch actuators 26d is preferably sufficient to release the latches so that no tools are required for this operation. When chuck 50/80 is in position in housing 20, the inclined lower surface of the end of each latch finger 26a as viewed in FIG. 3 preferably exerts camming pressure on the inclined lower surface of the associated recess 26b in order to continually urge the lower surface of flanges 54 into firm contact with the upper surface of housing 20. When latches 26 are released, spring-loaded pusher assemblies 28 automatically push chuck 50/80 a short way out of housing 20, which facilitates further complete removal of the chuck from the housing (e.g., by exposing cavities 60 in the underside of flanges 54). Preferably the removal of chuck 50/80 from housing 20 (and the replacement of that chuck with another one) can be done manually without the need for any tools.

Movable jaw 80 is supported on fixed jaw 50 by two pins 82 which extend through jaw 50 into jaw 80. The ends of pins 82 are fixed in movable jaw 80 but are movable relative to jaw 50 parallel to their longitudinal axes (which coincide with or are parallel to axis 14). Accordingly, pins 82 move with jaw 80. Belleville washers 84 or other resilient means are provided under the enlarged heads of pins 82 for resiliently urging jaw 80 to retract from stator 12. In this way jaws 50 and 80 are biased toward the open position when the pressure from actuator structure 30 is removed as described below.

Housing 20 carries a structure 30 for normally closing jaws 50 and 80 by pushing in on the heads of pins 82. Actuator structure 30 includes a bar 32 which is mounted on housing 20 by bushings 34 and bolts 36, which fasten bushings 34 to the housing. Prestressed compression coil springs 38, which act between bar 32 and the heads of bushings 34, resiliently urge bar 32 toward the heads of pins 82. The force of springs 38 is much greater than the force of springs 84. Accordingly, springs 38 provide the force required to close jaws 50 and 80 and to clamp stator 12 in those jaws. A roller 40 is mounted on each end of bar 32. When it is desired to open jaws 50 and 80 for any reason such as to release stator 12 and/or to replace chuck 50/80 with another chuck, rollers 40 may be pushed in the direction away from the heads of pins 82. For example, this may be done automatically at certain stations in the stator processing apparatus with which the depicted apparatus is used by running rollers 40 over suitably shaped cams at those stations.

It will be apparent from the foregoing that when stators of different sizes (e.g., different lengths and especially different diameters) are to be handled, elements 50 and 80 are removed from housing 20 as a unit and replaced with new elements 50 and 80 having the same interface with housing 20 but different interior surface shapes for engaging differently shaped stators. All that is required to remove elements 50 and 80 is to manually retract latches 26 and pull elements 50 and 80 out of housing 20. (This may be most easily done when bar 32 is retracted as described above to remove all pressure from the heads of pins 82.) Each set of elements 50 and 80 always remain together, whether in or out of housing 20.

Figure 7:
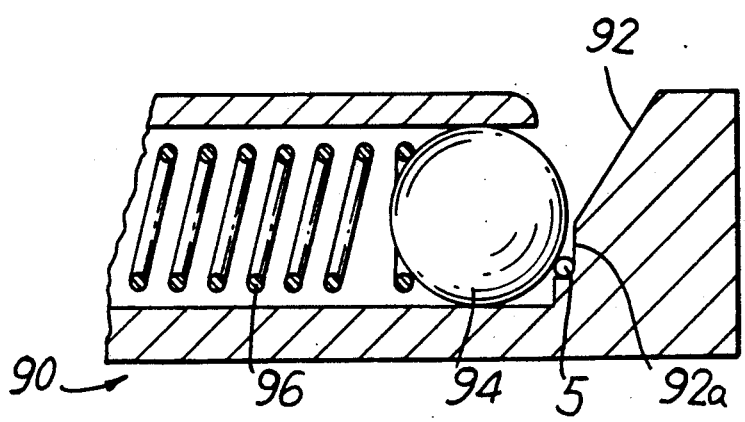
FIG. 7 is a partial sectional view taken along the line 7—7 in FIG. 6.
Figure 6:
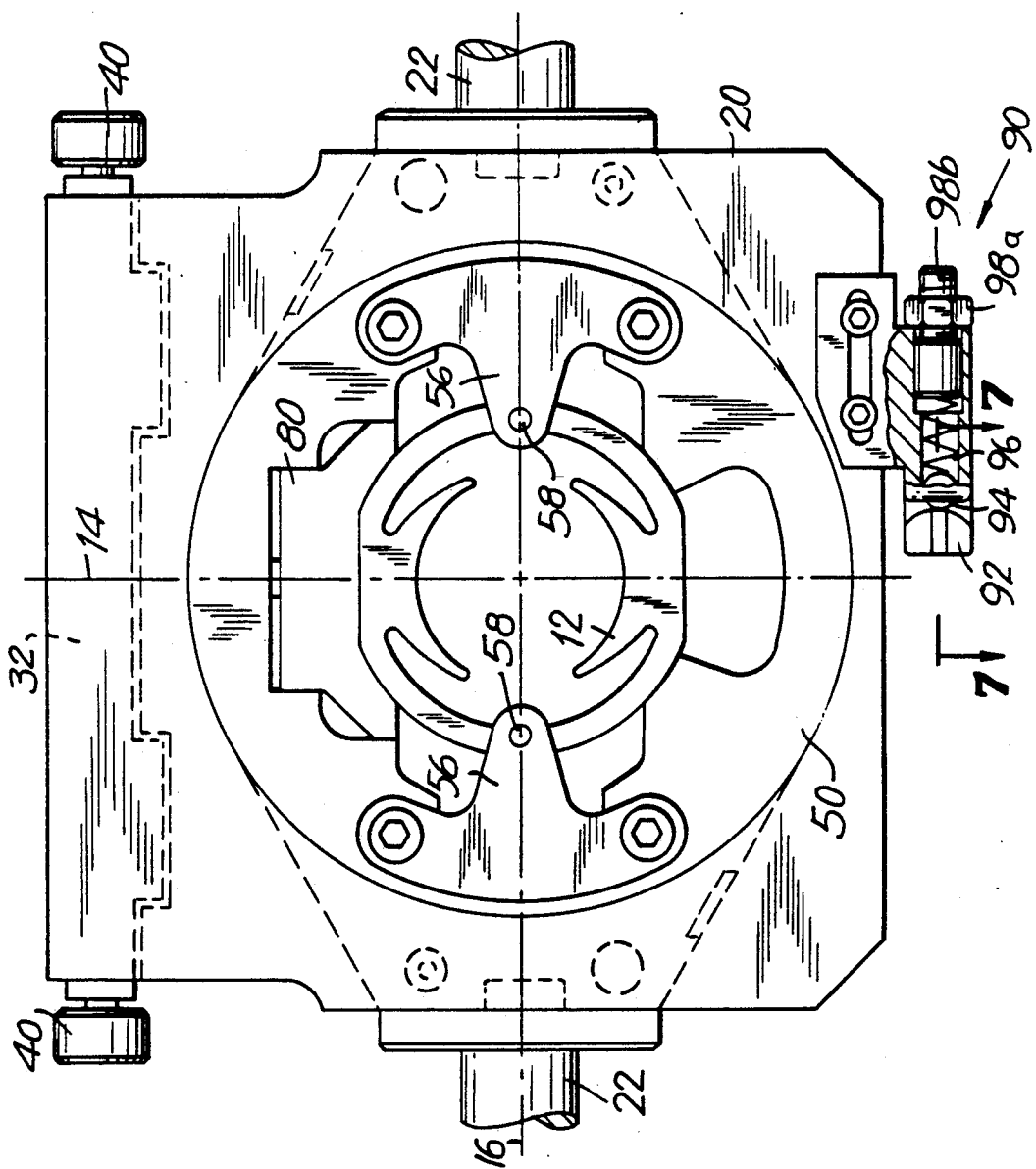
FIG. 6 is an elevational view of the opposite side of the apparatus shown in FIG. 1.

FIG. 6, which for the most part shows the opposite side of the apparatus from FIG. 1, also shows an additional optional feature of the invention (see also FIG. 7). If desired, one or more wire grippers 90 can be mounted on housing 20 for releasably gripping the ends of wires (a representative wire 5 being shown in FIG. 7) wound on the poles of stator 12. Gripper 90 includes two opposing surfaces 92 and 94 for gripping a wire between them. Surfaces 92 and 94 are movable relative to one another, but are resiliently biased toward one another, e.g., by prestressed compression coil spring 96. To facilitate insertion of a wire in wire gripper 90, the surface of each of members 92 and 94 which faces the other member is advantageously convex when viewed from the other member. Member 94 is conveniently constituted as a ball. Surface 92 may include a groove, notch, or seat 92a for receiving wire 5 and helping ball 94 releasably trap the wire. The force which spring 96 exerts on ball 94 may be adjusted by turning nut 98a relative to threaded spring retainer 98b. Gripper 90 can grip or release a wire without the need for a separate actuator to operate the gripper. Although shown mounted on housing 20 in FIG. 6, gripper 90 could alternatively be mounted elsewhere on the apparatus, e.g., on fixed jaw member 50.

It will be understood that the foregoing is merely illustrative of the principles of this invention, and that various modifications can be made by those skilled in the art without departing from the scope and spirit of the invention. For example, although the base of fixed jaw 50 which fits in housing 20 is shown as a circular cylinder, it could have any other shape such as hexagonal, octagonal, square, oval, etc.

The invention claimed is:

1. Apparatus for releasably holding a stator comprising:

a housing having an aperture surrounding an axis;

a first jaw member removably mounted in said aperture of said housing, said first jaw member having a hollow interior adapted to hold a stator;

a second jaw member mounted in a portion of said hollow interior of said first jaw member for movement relative to said first jaw member toward the center of said hollow interior of said first jaw member; and an actuator member mounted on said housing for selectively urging said second jaw member toward the center of said hollow interior of said first jaw member to grip a stator placed in said hollow interior between said second jaw member and the remaining portion of said hollow interior which is adapted to hold a stator and is not occupied by said second jaw member, said actuator member including contact means in operative contact with said second jaw member to urge said second jaw member toward the center of said hollow interior of said first jaw member, wherein said actuator member allows for unrestricted movement of said first and second jaw members in a direction parallel to said axis to allow said first jaw member to be readily removed from said housing when stators of different sizes are to be held, said first jaw member carrying with it said second jaw member.

2. The apparatus defined in claim 1 further comprising:
means associated with said first and second jaw members for resiliently biasing said second jaw member into a stator-releasing position relative to said first jaw member.

3. The apparatus defined in claim 2 wherein said actuator member comprises:
means associated with said housing for resiliently biasing said second jaw member into a stator-gripping position relative to said first jaw member, said means associated with said housing being strong enough to overcome the resilient bias of said means associated with said first and second jaw members.

4. The apparatus defined in claim 1 further comprising:
means for releasably latching said first jaw member in said housing.

5. The apparatus defined in claim 4 wherein said means for releasably latching comprises:
means for resiliently urging said first jaw member into said housing while said first jaw member is releasably latched in said housing.

6. The apparatus defined in claim 4 further comprising:
means for resiliently urging said first jaw member out of said housing, said means for releasably latching being strong enough to overcome said urging while said first jaw member is releasably latched in said housing.

7. The apparatus defined in claim 1 wherein said first jaw member comprises an annular member, and wherein said second jaw member is disposed in said hollow interior adjacent to one side of a stator in said hollow interior.

8. The apparatus defined in claim 7 wherein said second jaw member is mounted for movement which is radial relative to said annular member.

9. The apparatus defined in claim 1 further comprising:
a stop member mounted on one of said first and second jaw members for stopping a stator at a predetermined location relative to said first and second jaw members even when said second jaw member is in a stator-releasing position relative to said first jaw member.

10. The apparatus defined in claim 9 wherein said stop member is mounted on said first jaw member.

11. The apparatus defined in claim 9 wherein said stop member includes means for fixing the angular orientation of said stators relative to said first and second jaw members.

12. The apparatus defined in claim 1 further comprising:
means for fixing the angular orientation of said first jaw member relative to said housing.

13. The apparatus defined in claim 1 further comprising:
a wire gripper for releasably gripping a wire wound on said stator.

14. The apparatus defined in claim 13 wherein said wire gripper is mounted on said housing.

15. The apparatus defined in claim 13 wherein said wire gripper comprises:
first and second relatively movable members for releasably retaining a wire in said wire gripper; and
means for resiliently urging said first and second members toward one another.

16. The apparatus defined in claim 15 wherein said first member appears convex when viewed from said second member, and said second member appears convex when viewed from said first member.

17. The apparatus defined in claim 16 wherein the surface of said second member adjacent said first member is spherical in shape.

18. The apparatus defined in claim 17 wherein said second member comprises a ball, and wherein said means for resiliently urging comprises a spring for pressing said ball against said first member.

19. The apparatus defined in claim 18 further comprising means for adjusting the force exerted by said spring on said ball.

* * * * *